(12) United States Patent
Smith et al.

(10) Patent No.: US 7,521,028 B2
(45) Date of Patent: Apr. 21, 2009

(54) CATALYTIC REACTOR FOR LOW-BTU FUELS

(75) Inventors: Lance Smith, North Haven, CT (US); Shahrokh Etemad, Trumbull, CT (US); Hasan Karim, Simpsonville, SC (US); William C. Pfefferle, Madison, CT (US)

(73) Assignee: Precision Combustion, Inc., North Haven, CT (US)

( * ) Notice: Subject to any disclaimer, the term of this patent is extended or adjusted under 35 U.S.C. 154(b) by 461 days.

(21) Appl. No.: 11/261,190

(22) Filed: Oct. 27, 2005

(65) Prior Publication Data

US 2007/0098604 A1 May 3, 2007

(51) Int. Cl.
*B01J 8/04* (2006.01)
*F23D 21/00* (2006.01)

(52) U.S. Cl. .................. 422/190; 422/200; 422/201; 422/222; 431/170

(58) Field of Classification Search .......... 422/190, 422/200, 201, 222; 431/170
See application file for complete search history.

(56) References Cited

U.S. PATENT DOCUMENTS

| | | | |
|---|---|---|---|
| 5,326,252 A * | 7/1994 | Tonon | 431/2 |
| 6,019,951 A * | 2/2000 | Sie et al. | 422/222 |
| 6,174,159 B1 * | 1/2001 | Smith et al. | 431/7 |
| 6,358,040 B1 * | 3/2002 | Pfefferle et al. | 431/7 |
| 6,394,791 B2 * | 5/2002 | Smith et al. | 431/170 |
| 6,752,623 B2 * | 6/2004 | Smith et al. | 431/170 |
| 6,829,896 B2 * | 12/2004 | Bruck et al. | 60/723 |
| 6,932,950 B1 * | 8/2005 | Guetlhuber | 422/202 |
| 2003/0072708 A1 * | 4/2003 | Smith et al. | 423/659 |
| 2004/0105795 A1 * | 6/2004 | Gough | 422/201 |

* cited by examiner

*Primary Examiner*—N. Bhat
(74) *Attorney, Agent, or Firm*—Robert L. Rispoli

(57) ABSTRACT

An improved catalytic reactor includes a housing having a plate positioned therein defining a first zone and a second zone, and a plurality of conduits fabricated from a heat conducting material and adapted for conducting a fluid therethrough. The conduits are positioned within the housing such that the conduit exterior surfaces and the housing interior surface within the second zone define a first flow path while the conduit interior surfaces define a second flow path through the second zone and not in fluid communication with the first flow path. The conduit exits define a second flow path exit, the conduit exits and the first flow path exit being proximately located and interspersed. The conduits define at least one expanded section that contacts adjacent conduits thereby spacing the conduits within the second zone and forming first flow path exit flow orifices having an aggregate exit area greater than a defined percent of the housing exit plane area. Lastly, at least a portion of the first flow path defines a catalytically active surface.

6 Claims, 6 Drawing Sheets

CATALYTIC REACTOR FOR LOW-BTU FUELS

GOVERNMENT RIGHTS

This invention was made with government support under Department of Energy Agreement No. DE-FC26-03NT41721. The U.S. government has certain rights in this invention.

FIELD OF THE INVENTION

The present invention is generally directed to a catalytic reactor for use in a combustion system, for example, the combustion system of a gas turbine engine. More particularly, this invention is directed toward an air-cooled catalytic reactor for reacting a fuel-rich mixture of a low-Btu fuel and air, without excessive pressure drop.

BACKGROUND OF THE INVENTION

Historically, gas turbine engines have used a wide variety of hydrocarbon fuels such as natural gas, jet fuel, and diesel fuel. For these fuels, flame temperatures in air can exceed 3000° F. and reaction rates thus become sufficiently fast that complete combustion is easily achieved. For low-Btu fuels, however, such as gasified coal, blast furnace gas, or landfill or other waste gases, sufficient diluent may be present that flame temperatures and reaction rates are reduced to the point that combustion is difficult to sustain. Thus, a catalyst may be employed to increase the rate of reaction until gas-phase combustion can be sustained.

One attractive option for catalytic combustion of low-Btu fuels is to use the method and apparatus described in U.S. Pat. No. 6,358,040 and its divisional U.S. Pat. No. 6,394,791 (respectively, "the '040 Patent" and "the '791 Patent"). These patents describe an air-cooled catalytic reactor comprising metal conduits or tubes having catalyst-coated exterior surfaces. In operation, fuel is mixed with air in fuel-rich proportions and contacted with the catalyst. A separate air stream passes through the tubes' interiors to cool the catalyst. At the reactor exit (the downstream end of the tubes), the cooling air stream mixes with the catalytically-reacted fuel-rich stream to create a fuel-lean mixture to promote complete combustion.

In the embodiment depicted in the '791 patent, the reactor comprises round tubes passing through a reactor housing, where such tubes are held at their upstream ends by attachment to a perforated plate. At their downstream ends, however, it is preferred that the tubes are self-supported by simply resting against one another. This self-supporting arrangement avoids the need for an additional support structure in the reactant stream outside the tubes, where the possibility of gas-phase reactions and high temperatures complicates the design requirements of such a structure. In contrast, the tubes themselves are already air-cooled and designed to withstand a high-temperature environment.

As also described in the '791 patent, it is preferred that the tubes are spaced apart along most of their length within the reactor housing, thus creating a single catalytic reaction channel around the exterior surface of the tubes and the interior of the housing thereby allowing the reactant stream to enter the reaction channel from the side through an aperture in the housing, crossing over the tubes. This provides complete separation between the reactant stream and the cooling air stream which enters the tube interiors through the perforated plate. Thus, it is preferred that the tubes are expanded (flared) over a portion of their length, at or near their downstream ends (opposite the plate end), so that adjacent tube flares touch each other but the tubes are otherwise separated. This is most easily accomplished by expanding round tubes to a larger round diameter at their downstream ends, as shown in FIG. 9 of the '791 patent.

Thus, in a practical, easy-to-manufacture implementation of the '791 patent's catalytic reactor, the downstream end of the reactor becomes an arrangement of contacting circles having equal diameters. Various packing arrangements are possible. For example, the circles may be placed in a square-pack arrangement, as shown in FIG. 1 herein. In this packing arrangement the space between the contacting circles, from which all catalytically reacted effluent must exit, comprises more than 20%, a desirable feature allowing lower pressure drop designs. However, the square-pack arrangement has a disadvantage: for reactors having many tubes, if one tube moves out of position then other tubes may shift position, and in fact the entire assembly of tubes tends to shift position. There are many reasons a single tube might move out of position. The single tube might have a slightly smaller diameter than the others; it may be out-of-round; or, if the tube contacts the housing of the reactor, it may shift position if the housing is not dimensioned correctly. Because the fit of one tube with adjacent tubes affects the position of other tubes, practitioners characterize the square-pack arrangement as "unstable." For the purpose of this description, an "unstable" packing is one wherein multiple tubes can shift position if one tube moves.

A "stable" packing, on the other hand, results when the tubes are placed in a close-pack arrangement, as shown in FIG. 2 the tightest arrangement possible. Here, each tube contacts six adjacent tubes. Even if a single tube is removed, the remaining tubes will stay in their original positions. This is evident in FIG. 2: if tube A is removed, tube B will stay in position because it is held in place by tubes C and D, and by tubes E. Likewise, tube C will stay in place, as will tube D and tubes E. Tubes C and D prevent tube B from moving because the distance between the contact point where tubes B and C touch, and the contact point where tubes B and D touch, is less than the flared diameter of tube B (i.e. the diameter of tube B shown in FIG. 2, in the plane where it contacts tubes C, D, and E). Thus tube B is held in place, wedge-like, between tubes C and D.

In general, lateral (radial) support is best provided when the tubes are packed in their densest (close-packed) configuration as shown in FIG. 2. However, in this packing arrangement the space between the contacting circles, from which all catalytically reacted effluent must exit, comprises less than about 10% of the total gas flow area, depending on tube wall thickness, the remaining flow area being supplied by the cooling air exits inside the tube circles and the sum of the tube wall areas. For catalytic combustion of hydrocarbon fuels such as natural gas, it is preferred that approximately 15% or more of the total air pass through the catalytic reaction channel, with the remainder passing through the inside of the tubes as cooling fluid. Thus, a fuel-rich mixture having an equivalence ratio (the ratio of the actual fuel/air ratio to the stoichiometric fuel/air ratio; an equivalence ratio greater than one defines a fuel-rich fuel/air mixture, and an equivalence ratio less than one defines a fuel-lean fuel/air mixture) of about 3 reacts on the catalyst, and then mixes with the cooling air upon exiting the reactor to give an overall equivalence ratio of about 0.5. For this example, when the natural gas fuel is added, approximately 20% of the total volume of fluid (fuel plus air) passes through the catalytic reaction channel and must exit from the small area between the contacting circles at the reactor's downstream end, causing undue pressure drop. Accordingly, reactor designs providing catalytic channel exit areas greater than that of close pack reactors by at least twenty percent are needed. In contrast, by positioning a restrictor plate upstream of the cooling holes, one may create extra undesirable pressure drop and increase the split.

For other fuels, even higher catalytic channel exit areas are often needed. For example, for low-Btu fuels such as coal-derived syngas, blast furnace gas, or waste gas from industrial or biological processes, the fuel's heating value per unit volume of fuel gas can be 25% (or less) of the natural gas heating value, requiring greatly increased volume flow of fuel. Thus if a syngas fuel, having 25% of the heating value of natural gas, is mixed with air to provide an equivalence ratio of about 3 and then reacted on the catalyst, more than 30% of the total volume of fluid passes through the catalytic reaction channel is fuel gas(assuming an overall equivalence ratio of about 0.5 after mixing with catalyst cooling air downstream of the reactor). Again, this 30% of total volume must pass through the total cross-sectional area at the reactor's downstream end, causing further undue pressure drop. Frequently, heating values are well below 25% of the natural gas value, requiring even greater flow of fluid through the catalytic reaction channel.

Based on the foregoing, it is an objective of the present invention to provide a method and apparatus for an improved configuration of the elements comprising a catalytic reactor having a catalytic reaction channel and separate cooling air stream channels. It is a further objective of the present invention to retain the benefits of manufacturing ease and positive lateral support via a stable packing arrangement within the catalytic reactor. It is yet another objective of the present invention to provide greater flow area between the contacting tube element exits.

SUMMARY OF THE INVENTION

The present invention is a catalytic reactor comprising an assembly of catalyst-coated tubes and having catalytic channel exit areas at least twenty percent larger than a close pack assembly, more preferably fifty percent larger. More particularly, the present invention teaches a stable tube packing arrangement that provides greater flow area between, or outside of, contacting tubes than the close-packed configuration depicted in FIG. 2. One stable packing arrangement according to the present invention is achieved by packing the tubes in rows comprising tube pairs that are alternately horizontally-adjacent then vertically-adjacent, and so on. An embodiment of the present invention comprises a catalytic reactor wherein the catalytic reactor comprises an assembly of tubes packed such that some groups of tubes are close-packed while other groups of tubes are square-packed. This packing arrangement is depicted in FIG. 3, where the shaded circles depict one row of the packing arrangement, highlighting the pattern required in each row to achieve a packing arrangement according to the present invention.

In a preferred embodiment of the present invention, straight tubes are packed in the arrangement described above and depicted in FIG. 3 at both the upstream and downstream ends of the tubes, such that the tubes are parallel to one another. At the upstream end, however, the tubes are not expanded or flared, but are instead inserted and brazed into holes drilled in an upstream mounting plate, in a manner analogous to that shown in FIG. 9 of the '791 patent. At the downstream end, the tubes are expanded, or flared, to a diameter slightly larger than the original tube diameter, such that the tubes are supported at each end and are held parallel to each other, but are spaced slightly apart along most of their length. The assembly of tubes is inserted into a housing, and a seal is made between the upstream mounting plate and the upstream end of the housing.

In another preferred embodiment of the present invention shown in FIG. 7, even larger reaction channel exit area is achieved by use of tubes having two different flare diameters. As in FIG. 3, the tubes are packed in rows comprising tube pairs that are alternately horizontally-adjacent then vertically-adjacent. The embodiments of FIGS. 3 and 7 each provide catalytic channel exit area greater than 15%.

In operation, as in the method described in the '040 Patent, a fuel-rich mixture of fuel and air passes through one or more apertures in the housing to contact the catalyst coating on the outside surfaces of the tubes. Because the tubes are spaced apart along most of their length, the fuel-rich fuel/air mixture can pass around and between the tubes to contact all tube surfaces, except where the tubes touch at their downstream ends, or where they are inserted in the upstream mounting plate. Cooling air enters the tube interiors through the holes in the upstream mounting plate. The method for sealing the tubes to the upstream mounting plate, such as by brazing, prevents the cooling air from contacting the fuel-rich fuel/air mixture. At the downstream end of the tubes, the catalytically reacted fuel-rich fuel/air mixture exits the reactor from between the tubes, while the cooling air exits the tube interiors. These two streams then mix, and the additional oxygen provided by the cooling air allows all fuel to burn to completion. Tube packing configurations described herein promote low pressure drop with high fuel flow.

The apparatus of the present invention is advantageous in that it aids the combustion of low-Btu fuels having flame temperatures lower than conventional fuels by catalytically reacting a portion of the fuel and increasing the temperature of the fuel/air mixture entering the combustor, where combustion is then completed in the gas phase (non-catalytically).

BRIEF DESCRIPTION OF THE DRAWINGS

FIG. 1 represents a view, looking upstream, of the end-face of a catalytic reactor comprising a square-pack bundle of tubes. FIG. 1 depicts prior art.

FIG. 2 represents a view, looking upstream, of the end-face of a catalytic reactor comprising a close-pack bundle of tubes. FIG. 2 depicts prior art.

DETAILED DESCRIPTION OF THE INVENTION

Figure 1:
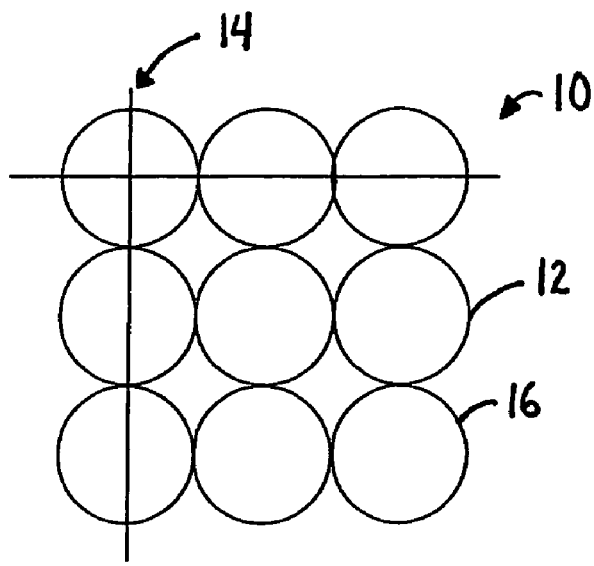
FIG. 1 depicts a square-pack arrangement of equal size circles, wherein the centers of the circles are located on a square grid.

As briefly described above, FIG. 1 depicts a square-pack arrangement 10 of equal size circles 12, wherein the centers of the circles are located on a square grid 14. FIG. 1 represents a view, looking upstream, of the end-face of a catalytic reactor comprising a square-pack bundle of tubes 16.

Figure 2:
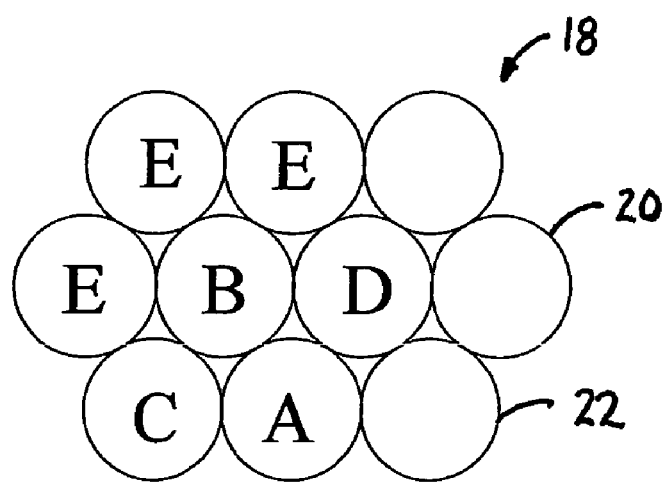
FIG. 2 depicts a close-pack arrangement of equal size circles, wherein the centers of the circles are located on a triangular grid.

FIG. 2 depicts a close-pack arrangement 18 of equal size circles 20, wherein the centers of the circles are located on a triangular grid. This packing arrangement is known as "close-pack" since it provides the greatest density of circles per unit area in the packed configuration. FIG. 2 represents a view, looking upstream, of the end-face of a catalytic reactor comprising a close-pack bundle of tubes 22. As described hereinabove with reference to prior art, a "stable" packing, results from the close-pack arrangement. Tube B contacts six adjacent tubes. If an adjacent tube is removed, Tube A for example, Tube B will stay in position being held in place by Tubes C and D, and by Tubes E. Likewise, Tubes C, D, and E will similarly be held in place.

Figure 3:
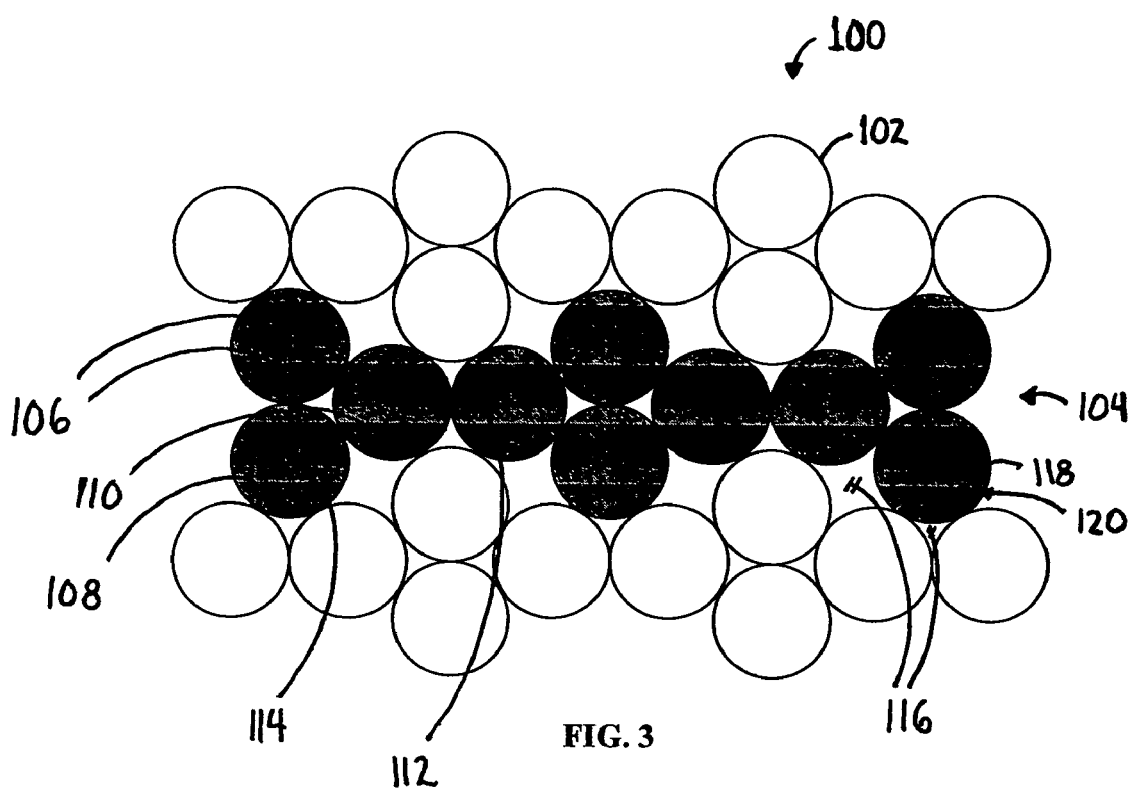
FIG. 3 depicts the packing arrangement of equal size circles of the present invention.

FIG. 3 depicts the packing arrangement 100 of equal size circles 102 of the present invention. The center row 104 of circles 102 is shown as shaded to highlight the repeating pattern 106 required to create packing arrangement 100. Each row of circles consists of the repeating pattern 106 comprising a contacting pair of circles 108 oriented vertically (that is, with the circle centers located on a vertical line) followed by a pair of contacting circles 110 oriented horizontally (that is, with the circle centers located on a horizontal line). The center or centroid of each pair of circles is located along a common horizontal line 112, the row's centerline. The same pattern is repeated for each column of circles, with the center or centroid of each pair of circles located along a common vertical line 114.

Referring to FIG. 3, it is straightforward to calculate the percentage of total area between the contacting circles, where the catalytically reacted fuel-rich stream exits the catalytic reactor. This area is comprised of triangle-like or diamond-like shapes 116 having arced sides. For the packing arrangement 100 depicted in FIG. 3, 15.82% of the total area is between the contacting circles. This is a significant improvement over the 9.3% of total area that exists between close-pack arrangement 18 depicted in FIG. 2.

The packing arrangement 100 of FIG. 3 is also stable. If a single tube 118 is removed, the other tubes 118 do not shift position. This is because every tube 118, represented by circles 120, in packing arrangement 100 is surrounded by five other tubes 118 within which it is in contact. By comparison, every tube 16 in the square-pack arrangement 10 of FIG. 1 is surrounded by only four other tubes 16, while every tube 22 in the close-pack arrangement 18 of FIG. 2 is surrounded by six other tubes 22.

In the square-pack arrangement 10 of FIG. 1, the tangent lines that run through the contact points between adjacent circles form 90-degree angles. If one tube 16 moves it will tend to fall into an interstitial opening decreasing the volume occupied by the assembly thereby allowing other tubes to move. Thus this arrangement is inherently unstable. On the other hand, in the close-pack arrangement 18 of FIG. 2, the tangent lines that run through the contact points between adjacent circles form 60-degree angles, and if one tube 22 is removed the nearest contact points on the center tube 22 form a 120-degree angle. This angle wedges the tubes 22 in place, as described earlier, so that the center tube 22 cannot move even if an adjacent tube 22 is removed.

In the packing arrangement 100 of the present invention, the tangent lines that run through the contact points between adjacent circles form angles less than 90-degrees, and, like the close-pack arrangement 18 of FIG. 2, if one tube 118 is removed, the nearest contact points on the center tube 118 form an angle less than 180 degrees. Although the angle can be larger than the 120-degree angle of the close-pack arrangement 18, the fact that the angle is less than 180 degrees means that the center tube 118 is held in place wedge-like, so that the center tube 118 cannot move even if an adjacent tube 118 is removed.

Figure 4A:
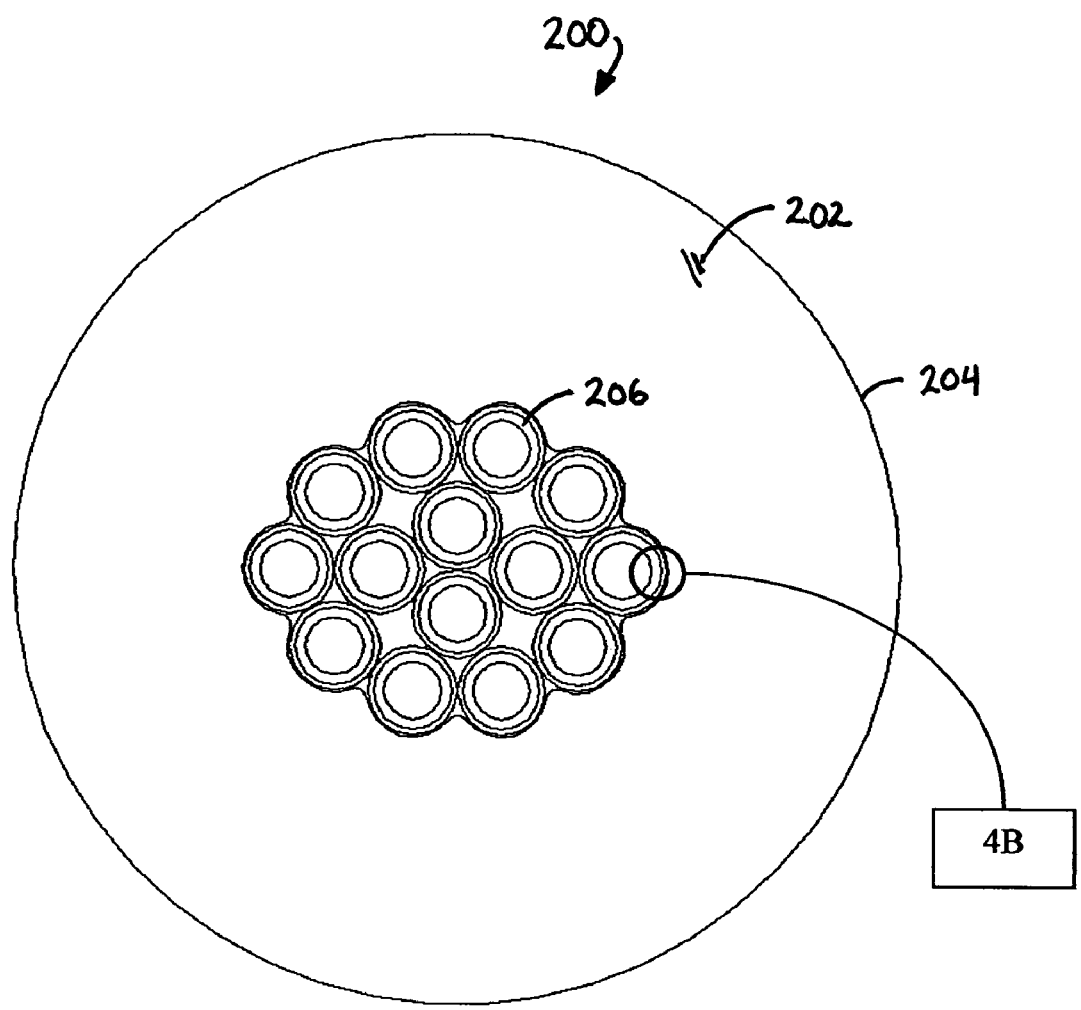
FIG. 4A depicts a view of the upstream end-face, looking downstream, of a housing of a catalytic reactor according to the present invention comprising the packing arrangement of FIG. 3.
Figure 4B:
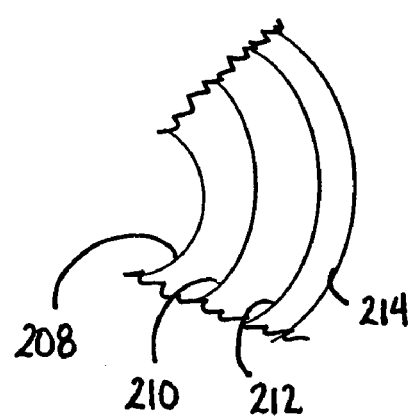
FIG. 4B provides greater detail of a single tube positioned within the housing of the catalytic reactor of FIG. 4A.

FIG. 4A provides a view, looking downstream, of the upstream end-face 202 of a housing 204 of a catalytic reactor 200 according to the present invention. As shown on FIG. 4A, the catalytic reactor 200 comprises a housing 204 and conduits or tubes 206 of comprising the packing arrangement 100 of FIG. 3. FIG. 4B provides greater detail of a single tube 206 positioned within the housing 204 of the catalytic reactor 200 of FIG. 4A. Referring to FIG. 4B, the tube 206 defines an inner diameter 208, a flare inner diameter 210, and a flare outer diameter 212. Housing 204 defines a housing inner surface 214.

Figure 5:
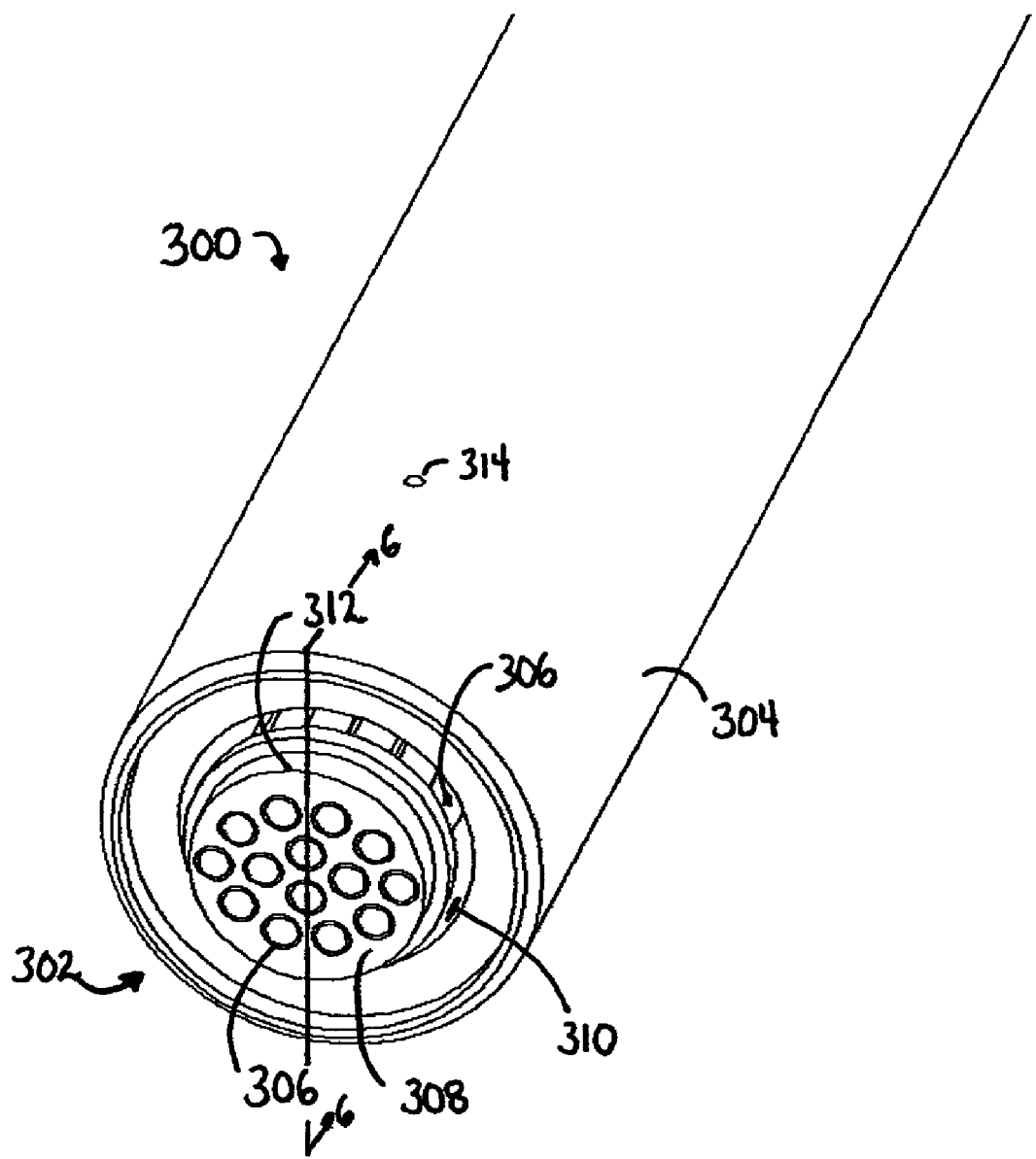
FIG. 5 provides an isometric view of the catalytic reactor of FIG. 4A.

FIG. 5 depicts an isometric view, looking downstream, of the upstream end 302 of a catalytic reactor 300 according to the present invention. As shown on FIG. 5, catalytic reactor 300 comprises a housing 304 and conduits or tubes 306 of comprising the packing arrangement 100 of FIG. 3. As described hereinabove with reference to the '791 patent, catalytic reactor 300 comprises tubes 306 passing through housing 304, where such tubes 306 are held at their upstream ends by attachment to a perforated plate 308. At their downstream and flared ends, not shown in FIG. 5, the tubes are self-supported by simply resting against one another as shown in FIG. 4A. A gap 310 is depicted in FIG. 5 to illustrate that in a preferred embodiment of the present invention, a module 312 comprised of the perforated plate 308 and the tubes 306 can be positioned within housing 304 as a means of assembly or retrofit of catalytic reactor 300. Apertures 314 are provided for instrumentation purposes.

Figure 6:
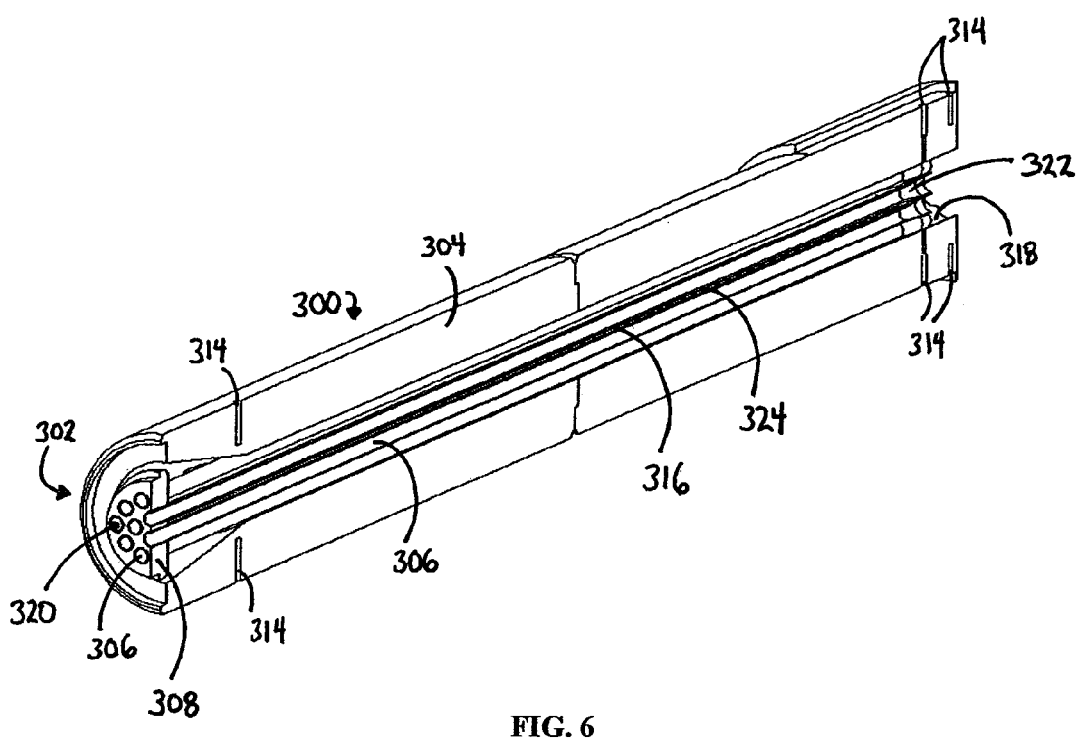
FIG. 6 depicts a cross-sectional view taken along line 6-6 of the catalytic reactor of FIG. 4A and FIG. 5.

FIG. 6 depicts a cross-sectional view taken along line 6-6 of the catalytic reactor of FIG. 5. The tubes 306 are spaced apart along most of their length within the housing 304, thus creating a single catalytic reaction channel around the exterior surface 316 of the tubes 306 and the housing inner surface 318. As described in the '791 patent, a reactant stream enters the reaction channel from the side of the housing 304 through an aperture (not shown) in housing 304, crossing over the tubes 306. This provides complete separation between the reactant stream and a cooling air stream that enters the tube interiors 320 through the perforated plate 308. Thus, it is preferred that the tubes 306 are expanded (flared) over a portion of their length, at or near their downstream ends 322 (opposite the plate end), so that adjacent tube flares touch each other but the tubes 306 are otherwise separated. This is most easily accomplished by expanding round tubes to a larger round diameter at their downstream ends 322.

Figure 7:
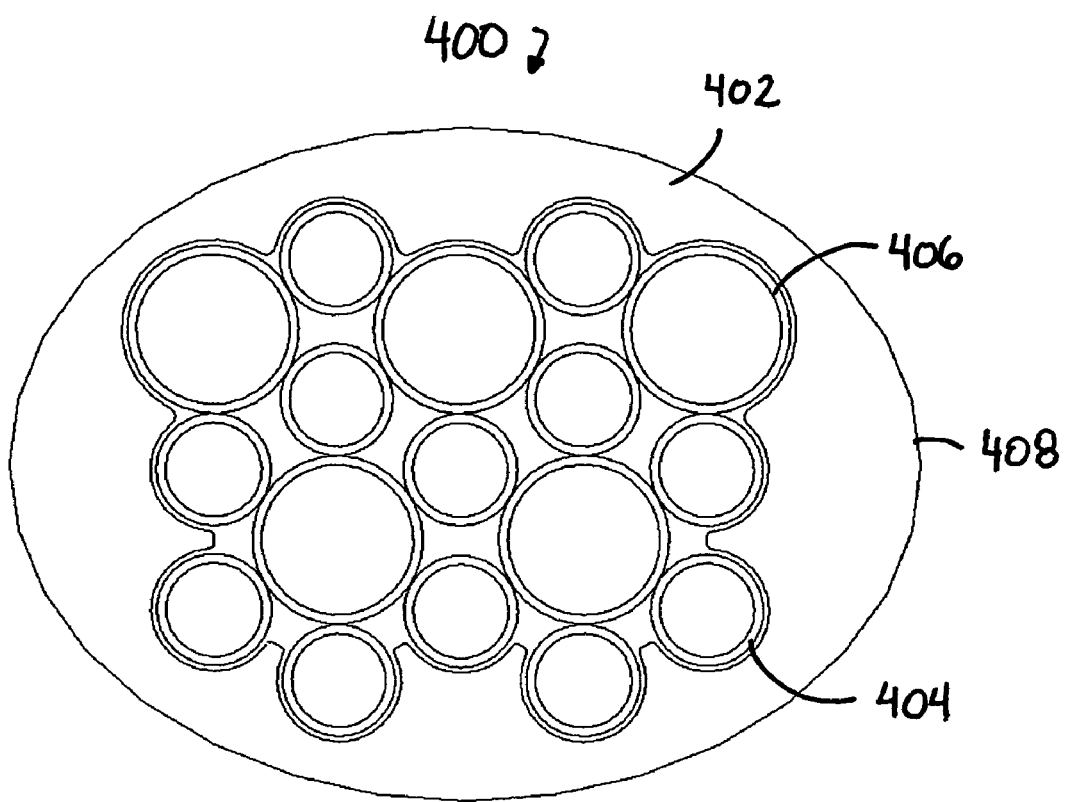
FIG. 7 depicts a cross-sectional view of the exit plane of a catalytic reactor having exit plane flared ends of different diameters.

FIG. 7 depicts a cross-sectional view of the exit plane 402 of catalytic reactor 400 having tubes 404 and 406 respectively defining different flare diameters. Tubes 404 and 406 are mounted in housing 408. Typically, the cooling airflow tubes also will define different diameters.

Any catalytic means can be used to make the flow path catalytic, the flowpath being defined by areas 116 as shown in FIG. 3, for example. Another embodiment of a catalytic flowpath is shown in FIG. 6 and referred to above as the single catalytic reaction channel formed by the exterior surface 316 of the tubes 306 and the housing inner surface 318. Such catalytic means may include: depositing a catalyst (active ingredient) onto a surface (substrate); constructing a structure from a material containing a catalyst; constructing a structure from a catalytic material; or using pellets. In a preferred embodiment, a conduit or tube 306 is considered a substrate and a catalyst 324 is deposited on the exterior surface 316 of tubes 306. Suitable catalysts are well known in the art.

The catalyst coating used in the present invention, where the fuel is a hydrocarbon and oxygen is the oxidizer, may have as an active ingredient precious metals, group VIII noble metals, base metals, metal oxides, or any combination thereof. Elements such as zirconium, vanadium, chromium, manganese, copper, platinum, palladium, osmium, iridium, rhodium, cerium, lanthanum, other elements of the lanthanide series, cobalt, nickel, iron, and the like may be used. The catalyst may be applied directly to the substrate, or may be applied to an intermediate bond coat or washcoat composed of alumina, silica, zirconia, titania, magnesia, other refractory metal oxides, or any combination thereof.

The catalyst-coated substrate may be fabricated from any of various high temperature materials. High temperature metal alloys are preferred, particularly alloys composed of iron, nickel, and/or cobalt, in combination with aluminum, chromium, and/or other alloying materials. High temperature nickel alloys are especially preferred. Other materials which may be used include ceramics, metal oxides, intermetallic materials, carbides, and nitrides. Metallic substrates are most preferred due to their excellent thermal conductivity, allowing effective backside cooling of the catalyst.

Fuel types include hydrocarbons, hydrocarbon oxygenates, and blends thereof. Suitable gaseous fuels include natural gas, methane, and propane. Suitable liquid fuels include gasoline, kerosene, No. 1 heating oil, No. 2 heating oil, and conventional aviation turbine fuels such as Jet A, Jet B, JP-4, JP-5, JP-7, and JP-8. "Hydrocarbon" not only refers to organic compounds, including conventional liquid and gaseous fuels, but also to gas streams containing fuel values in the form of compounds such as carbon monoxide, organic compounds, or partial oxidation products of carbon containing compounds. If the fuel is a liquid, it should be vaporized or atomized before mixing with air or while being mixed with air.

While the present invention has been described in considerable detail with reference to an air-cooled catalytic reactor for reacting a fuel-rich mixture of a low-Btu fuel and air, without excessive pressure drop, comprising a plurality of tubes configured as described herein, other catalytic reactor configurations exhibiting the characteristics taught herein are contemplated. Therefore, the spirit and scope of the invention should not be limited to the description of the preferred embodiments described herein.

We claim:

1. A catalytic reactor comprising:
   a) a reactor housing defining an interior surface, an upstream end, a downstream end, an exit plane at the downstream end, and at least one aperture;
   b) a perforated plate positioned within the upstream end of the reactor housing;
   c) a plurality of conduits passing through the perforated plate and from the upstream end of the reactor housing to the exit plane of the reactor housing;
   d) each conduit having an upstream end in fluid communication with the perforated plate and a downstream end proximate with the exit plane of the reactor housing, and each conduit defining a periphery having an exterior and an interior;
   e) the conduits positioned within the housing such that:
      i) a first flow path is provided through the reactor housing aperture, in fluid communication with the exterior of the conduits, and to the reactor housing exit plane for passing a reactant stream therethrough wherein the first flow path defines an entrance and an exit;
      ii) a second flow path is provided through the perforated plate and in fluid communication with the interior of the conduits for passing air through the conduits wherein the second flow path defines an entrance and an exit;
      iii) the first flow path exit and the second flow path exit being proximately located and interspersed;
      iv) the conduits are held in position at the upstream end of the conduits by attachment to the perforated plate, and the conduits are self-supported at the downstream end of the conduits by a conduit packing arrangement;
      v) the conduit packing arrangement defines a stable packing arrangement of the conduits and provides a first flow path aggregate exit area greater than about fifteen percent of the reactor housing exit plane area; and
      vi) at least a portion of the first flow path comprising a catalytically active surface.

2. The catalytic reactor of claim 1 wherein the conduits comprising the stable packing arrangement define a plurality of diameters.

3. The catalytic reactor of claim 1 wherein the stable packing arrangement of the conduits further comprises:
   a) a repeating pattern of a pair of contacting conduits oriented vertically positioned adjacent to a pair of contacting conduits oriented horizontally;
   b) wherein the center of each pair of conduits located along a common horizontal line comprises a horizontal row centerline; and
   c) wherein the center of each pair of conduits located along a common vertical line comprises a vertical column centerline.

4. A module for a catalytic reactor comprising:
   a) a perforated plate;
   b) a plurality of conduits passing through the perforated plate;
   c) each conduit having an upstream end in fluid communication with the perforated plate and each conduit defining a periphery having an exterior and an interior;
   d) the conduits positioned within the perforated plate such that:
      i) a first flow path is provided when the module is positioned within a catalytic reactor housing wherein the catalytic reactor housing defines an interior surface, an upstream end, a downstream end, an exit plane at the downstream end, and at least one aperture such that the first flow path is in fluid communication with the reactor housing aperture, the exterior of the conduits, and the reactor housing exit plane for passing a reactant stream therethrough wherein the first flow path defines an entrance and an exit;
      ii) a second flow path is provided through the perforated plate and in fluid communication with the interior of the conduits for passing air through the conduits wherein the second flow path defines an entrance and an exit;
      iii) the first flow path exit and the second flow path exit being proximately located and interspersed;

iv) the conduits are held in position at the upstream end of the conduits by attachment to the perforated plate, and the conduits are self-supported at the downstream end of the conduits by a conduit packing arrangement;

v) the conduit packing arrangement defines a stable packing arrangement of the conduits and provides a first flow path aggregate exit area greater than about fifteen percent of the reactor housing exit plane area; and vi) at least a portion of the first flow path comprising a catalytically active surface.

5. The module for a catalytic reactor of claim 4 wherein the stable packing arrangement of conduits define a plurality of diameters.

6. The module for a catalytic reactor of claim 4 wherein the stable packing arrangement of the conduits further comprises:

a) a repeating pattern of a pair of contacting conduits oriented vertically positioned adjacent to a pair of contacting conduits oriented horizontally;

b) wherein the center of each pair of conduits located along a common horizontal line comprises a horizontal row centerline; and c) wherein the center of each pair of conduits located along a common vertical line comprises a vertical column centerline.

* * * * *